United States Patent [19]

Scoggins et al.

[11] Patent Number: 5,086,163

[45] Date of Patent: Feb. 4, 1992

[54] AROMATIC SULFIDE/SULFONE POLYMER PRODUCTION

[75] Inventors: Lacey E. Scoggins, Bartlesville; Kenneth C. Hoover, Tulsa; Wei-Teh W. Shangi, Bartlesville, all of Okla.

[73] Assignee: Phillips Petroleum Company, Bartlesville, Okla.

[21] Appl. No.: 674,812

[22] Filed: Mar. 22, 1991

Related U.S. Application Data

[62] Division of Ser. No. 401,595, Aug. 31, 1989, Pat. No. 5,015,725, which is a division of Ser. No. 102,462, Sep. 29, 1987, abandoned.

[51] Int. Cl.$^5$ .............................................. C08G 75/16
[52] U.S. Cl. ...................................... 528/388; 528/171; 528/174
[58] Field of Search ........................ 528/388, 171, 174

[56] References Cited

U.S. PATENT DOCUMENTS

| | | | |
|---|---|---|---|
| 3,867,356 | 2/1975 | Campbell | 260/79.1 |
| 4,016,145 | 4/1977 | Campbell | 260/79.3 |
| 4,025,496 | 5/1977 | Anderson et al. | 260/79.1 |
| 4,096,132 | 6/1978 | Edmonds, Jr. | 260/79.1 |
| 4,102,875 | 7/1978 | Campbell | 528/388 |
| 4,127,713 | 11/1978 | Campbell | 528/391 |
| 4,324,886 | 4/1982 | Edmonds, Jr. et al. | 528/388 |
| 4,451,643 | 5/1984 | Edmonds, Jr. et al. | 528/387 |
| 4,495,332 | 1/1985 | Shiiki et al. | 528/388 |
| 4,529,818 | 7/1985 | Nesheiwat et al. | 562/553 |
| 5,015,725 | 5/1991 | Scoggins et al. | 528/388 |

FOREIGN PATENT DOCUMENTS 0039508 11/1981 European Pat. Off.
3405523 8/1985 Fed. Rep. of Germany.

*Primary Examiner*—Harold D. Anderson
*Attorney, Agent, or Firm*—J. D. Brown

[57] ABSTRACT

A process is provided for the production of aromatic sulfide/sulfone polymers which comprises contacting under suitable polymerization reaction conditions: (1) at least one dihaloaromatic sulfone, (2) water, and (3) a complex comprising at least one alkali metal hydrosulfide.

8 Claims, No Drawings

AROMATIC SULFIDE/SULFONE POLYMER PRODUCTION

FIELD OF THE INVENTION

This application is a division of copending application Ser. No. 401,595, filed Aug. 31, 1989, now U.S. Pat. No. 5,015,725, which was a division of application Ser. No. 102,462, filed Sept. 29, 1987, abandoned.

This invention relates to the production of aromatic sulfide/sulfone polymers. In accordance with another aspect, this invention relates to the production of aromatic sulfide/sulfone polymers exhibiting high molecular weight. In accordance with a further aspect, this invention relates to the production of aromatic sulfide/sulfone polymers in a simplified and readily controlled manner.

BACKGROUND OF THE INVENTION

Thermoplastic polymers having a high degree of heat resistance or thermal stability are the object of intensive research and development in many laboratories throughout the world. Since thermoplastic materials comprising these polymers can be molded rapidly and efficiently to articles of simple or complex design, mass production techniques can be utilized to provide a wide variety of useful products. Heat resistant thermoplastic polymers thus offer important advantages that can be used in applications such as electrical components, wire coatings, automotive parts, aircraft parts and the like. Often such polymers can be used in the form of composite materials which contain high temperature resistant fibers and fillers.

Arylene sulfide/sulfone polymers are thermoplastic polymers known in the art, and processes for making these polymers are disclosed in various U.S. Pat. Nos. of R. W. Campbell, e.g. 4,016,145, 4,102,875, 4,127,713 and 4,301,274. Although these patents represent significant and valuable advances in the art, there is a need for a simplified process which can provide aromatic sulfide/sulfone polymers having high molecular weight.

Accordingly, an object of our invention is to produce aromatic sulfide/sulfone polymers exhibiting high molecular weight.

It is a further object of our invention to provide a simplified, readily controllable process for producing high molecular weight aromatic sulfide/sulfone polymers.

Other objects and aspects, as well as the several advantages of our invention are apparent from a study of this disclosure and the appended claims.

BRIEF STATEMENT OF THE INVENTION

We have discovered in the preparation of aromatic sulfide/sulfone polymers that by utilizing a preformed complex comprising alkali metal hydrosulfide as a polymerization reaction component with a dihaloaromatic sulfone that high molecular weight polymers are formed.

More specifically, our invention utilizes a preformed complex comprising an alkali metal hydrosulfide and an alkali metal aminoalkanoate as a polymerization reaction component with a dihaloaromatic sulfone to produce aromatic sulfide/sulfone polymers or high molecular weight.

In one embodiment of our invention the preformed complex comprising alkali metal hydrosulfide is obtained by the reaction of an alkali metal aminoalkanoate with an alkali metal hydrosulfide in the presence of an organic amide.

In another embodiment of our invention the preformed complex comprising alkali metal hydrosulfide can be obtained by contacting at least one lactam with at least one alkali metal hydrosulfide, water, and at least one base selected from the group consisting of alkali metal hydroxides and mixtures of alkali metal hydroxides and alkali metal carbonates.

It is still another embodiment of our invention and one which is presently preferred, the preformed complex comprising alkali metal hydrosulfide can be obtained by contacting at least one lactam with water and at least one alkali metal hydroxide to form a reaction product comprising an alkali metal aminoalkanoate which is then contacted with at least one alkali metal hydrosulfide to produce said complex comprising the alkali metal hydrosulfide.

Further, according to our invention, the preformed complex comprising alkali metal hydrosulfide, which can be obtained by any one of the three embodiments described above, is then contacted with at least one dihaloaromatic sulfone under polymerization conditions of time, temperature and pressure sufficient to produce the aromatic sulfide/sulfone polymer of high molecular weight.

Our invention thus provides a simplified process for producing aromatic sulfide/sulfone polymers having a high molecular weight as well as good melt flow stability without an added step such as end-capping to promote melt flow stability of the polymer.

DETAILED DESCRIPTION OF THE INVENTION

According to our invention improved results in terms of the molecular weight of aromatic sulfide/sulfone polymers is achieved by the employment of a complex comprising an alkali metal hydrosulfide to react with a dihaloaromatic sulfone in a polymerization process to obtain the aromatic sulfide/sulfone polymer. The improved results are reflected in a higher inherent viscosity of the aromatic sulfide/sulfone polymer than that which can be obtained when the complex comprising an alkali metal hydrosulfide is not employed under otherwise comparable conditions.

In one embodiment, our invention provides a process for the production of high molecular weight aromatic sulfide/sulfone polymer by contacting: (a) an organic diluent selected from amides, hydrocarbyl sulfones and heterocyclic amines, (b) water, (c) a complex comprising an alkali metal hydrosulfide and an alkali metal aminoalkanoate and (d) a dihaloaromatic sulfone under suitable polymerization conditions to produce a high molecular weight aromatic sulfide/sulfone polymer.

In this embodiment the molar ratio of the organic diluent to the complex is about 2:1 to about 15:1, the molar ratio of water to organic diluent is about 0.5:1 to about 1.5:1, the molar ratio of dihaloaromatic sulfone to complex is about 0.9:1 to about 1.2:1 and the molar ratio of alkali metal hydrosulfide to alkali metal aminoalkanoate in said complex is substantially 1:1.

A suitable complex comprising an alkali metal hydrosulfide for use according to our invention can be obtained in one of three ways each of which is described more fully hereinafter. The above-mentioned three different ways of obtaining a suitable complex comprising an alkali metal hydrosulfide thus provide three further embodiments of our invention.

In the first further embodiment the complex comprising the alkali metal hydrosulfide is obtained by contacting at least one lactam, at least one alkali metal hydrosulfide, water, and at least one base selected from the group consisting of alkali metal hydroxides and mixtures of alkali metal hydroxides with alkali metal carbonates under reaction conditions of the time and temperature sufficient to produce a mixture containing a complex which comprises said at least one alkali metal hydrosulfide. In this embodiment of our invention the molar ratio of the lactam to the base is about 1:1 to about 15:1; the molar ratio of the base to the alkali metal hydrosulfide is about 0.9:1 to about 1.2:1, preferably about 0.95:1 to about 1.05:1; and the molar ratio of water to the lactam is about 0.5:1 to about 1.5:1 preferably about 0.8:1 to about 1.1:1. The reaction conditions suitable for obtaining the mixture containing a complex which comprises the alkali metal hydrosulfide include a temperature of about 105° C. to about 205° C., a time of about 5 minutes to about 5 hours, and although pressure is not limiting in the formation of the complex according to this embodiment it is preferred that the pressure be sufficient to maintain a liquid phase condition for the mixture.

A second further embodiment according to our invention which provides a complex comprising an alkali metal hydrosulfide suitable for use in the production of aromatic sulfide/sulfone polymers, employs a process which comprises contacting at least one alkali metal aminoalkanoate, at least one organic amide, and at least one alkali metal hydrosulfide under reaction conditions of time and temperature sufficient to produce a mixture containing a complex which comprises the alkali metal aminoalkanoate and the alkali metal hydrosulfide. In this embodiment the above-described mixture is then contacted with water and at least one dihaloaromatic sulfone under suitable polymerization conditions to form an aromatic sulfide/sulfone polymer.

For use of this embodiment of our invention the starting alkali metal aminoalkanoates can be obtained according to the teachings of U.S. Pat. No. 3,867,356 by the alkaline hydrolysis of a lactam.

In this embodiment of our invention the presence of the organic amide in the mixture in which the complex comprising an alkali metal hydrosulfide is formed is regarded as functioning as a diluent to assist in providing a liquid phase condition for the mixture. For use in this fashion the suitable organic amides can encompass acyclic amides as well as lactams which are employed in the other two embodiments for the preparation of the complex comprising an alkali metal hydrosulfide.

In this embodiment of our invention the molar ratio of the organic amide to the alkali metal hydrosulfide is about 2:1 to about 15:1, the molar ratio of the alkali metal aminoalkanoate to the alkali metal hydrosulfide is about 0.9:1 to about 1.2:1, preferably about 0.95:1 to about 1.05:1; and in the polymerization step the molar ratio of water to the organic amide is about 0.5:1 to about 1.5:1, preferably about 0.8:1 to about 1.05:1. The reaction conditions utilized to form the complex comprising the alkali metal hydrosulfide according to this embodiment of our invention include a temperature of about 105° C. to about 205° C. and a time of about 1 minute to about 30 minutes. Although pressure is not considered to be a limiting factor in the formation of the complex, it is preferred that a pressure sufficient to provide a liquid phase condition be employed.

A third further and currently preferred embodiment of our invention for the production of a complex comprising an alkali metal hydrosulfide for use in the production of an aromatic sulfide/sulfone polymer, employs two steps wherein in the first step at least one lactam, at least one alkali metal hydroxide, and water are contacted under reaction conditions of time and temperature sufficient to produce a mixture comprising an alkali metal aminoalkanoate. A second step is employed wherein the mixture comprising an alkali metal aminoalkanoate produced in the first step is contacted with at least one alkali metal hydrosulfide under reaction conditions of time and temperature sufficient to produce a second mixture containing a complex comprising the alkali metal hydrosulfide and the alkali metal aminoalkanoate. This second mixture which contains the complex comprising the alkali metal hydrosulfide is then employed to contact at least one dihaloaromatic sulfone under suitable polymerization conditions to produce an aromatic sulfide/sulfone polymer. This embodiment is currently preferred because it utilizes readily available starting materials and does not require a separate recovery step of any intermediate reactants needed to form the desired complex comprising the alkali metal hydrosulfide. Similarly, as with the previous embodiments, no recovery of the complex is required prior to contacting the dihaloaromatic sulfone in the polymerization step.

In this embodiment of our invention the molar ratio of the lactam to the alkali metal hydroxide is about 1:1 to about 15:1, the molar ratio of water to lactam is about 0.5:1 to about 1.5:1, preferably about 0.8:1 to about 1.1:1; and the molar ratio of alkali metal hydroxide to alkali metal hydrosulfide is about 0.9:1 to abut 1.2:1, preferably about 0.95:1 to about 1.05:1.

The reaction conditions for this embodiment of our invention include the utilization of a temperature of about 105° C. to about 205° C. and a time of about 5 minutes to about 5 hours for the first step wherein a first mixture comprising an alkali metal aminoalkanoate is formed, and a temperature of about 105° C. to about 205° C. and a time of about 1 minute to about 30 minutes in the second step where said first mixture is contacted with the alkali metal hydrosulfide to form a second mixture which contains the complex comprising alkali metal hydrosulfide and the alkali metal aminoalkanoate. As with the previously described other two embodiments, pressure is again not regarded as a limiting reaction parameter but it is again preferred that the pressure be sufficient to provide a liquid phase condition.

Alkali metal aminoalkanoates which can be employed in the process of our invention to prepare a complex comprising alkali metal hydrosulfide can be represented by the formula $R'_2N(CR'_2)_qCO_2M$, wherein each $R'$ is selected from the group consisting of hydrogen and hydrocarbyl radicals selected from alkyl, cycloalkyl, and aryl, and combinations thereof such as alkaryl, aralkyl, and the like, and the number of carbon atoms in each of said hydrocarbyl radicals being within the range of 1 to about 12, M is an alkali metal selected from lithium, sodium, potassium, rubidium, and cesium, q is an integer having a value of 1 to about 12, and the total number of carbon atoms in each molecule of the alkali metal aminoalkanoate is within the range of 2 to about 24.

Examples of some alkali metal aminoalkanoates which can be employed in the process of our invention include lithium aminoacetate, sodium N,N-dimethyl-2-aminopropionate, potassium N-ethyl-3-cycopentyl-3-aminopropionate, sodium N-methyl-4-aminobutyrate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutyrate, rubidium N,N-dibenzyl-2-p-tolyl-3-aminopropionate, cesium 4-aminobutyrate, sodium 5-aminopentanoate, potassium 6-aminohexanoate, sodium N-ethyl-4-aminobutyrate, sodium N-cyclohexyl-4-aminobutyrate, and the like and mixtures thereof.

The organic amides used in the method of our invention should be substantially liquid at the reaction temperatures and pressures employed. The amides can be cyclic or acyclic and can have 1 to about 24 carbon atoms per molecule, preferably 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-ethyl-2-pyrrolidone, N-cyclohexyl-2-pyrrolidone, N-dodecyl-3-octyl-2-pyrrolidone, N,N'-ethylenedi-2-pyrrolidone, hexamethylphosphoramide, tetramethylurea, and the like and mixtures thereof.

Hydrocarbyl sulfones that are used in the method of our invention as an organic diluent can be represented by the formula R"SO$_2$R", where each R" is a hydrocarbyl radical selected from the group consisting of alkyl, cycloalkyl, and aryl, and combinations thereof such as alkaryl, aralkyl, and the like, the number of carbon atoms in each R" being within the range of 1 to about 10 and the total number of carbon atoms in each molecule of the sulfone diluent being 2 to about 12, with the proviso that the two R"s, together, can represent an alkylene radical having 4 to about 12 carbon atoms in a cyclic sulfone having at least 4 carbon atoms in the heterocyclic ring.

Examples of some sulfone diluents that can be employed in the process of this invention include dimethyl sulfone, diethyl sulfone, diisopropyl sulfone, dibutyl sulfone, dihexyl sulfone, ethyl octyl sulfone, methyl decyl sulfone, dicyclohexyl sulfone, bis(3-methylcyclopentyl) sulfone, bis(cyclopentylmethyl) sulfone, diphenyl sulfone, propyl p-tolyl sulfone, methyl benzyl sulfone, tetramethylene sulfone (sulfolane), pentamethylene sulfone, hexamethylene sulfone, octamethylene sulfone, decamethylene sulfone, dodecamethylene sulfone, 2-methylhexamethylene sulfone, 3-ethylheptamethylene sulfone, 4-isopropyloctamethylene sulfone, 3-pentylpentamethylene sulfone, 2-octyltetramethylene sulfone, and the like, and mixtures thereof.

Heterocyclic amines that are used in the method of our invention as an organic diluent are selected from pyridines, quinolines, isoquinolines and alkyl substituted derivatives thereof and have 5 to about 15 carbon atoms per molecule.

Examples of some heterocyclic amines that can be employed in the process of this invention include pyridine, 2-methylpyridine, 3-ethylpyridine, 2-methyl-5-ethylpyridine, 4-isopropylpyridine, 2-butylpyridine, 3-hexylpyridine, 4-decylpyridine, pentamethylpyridine, quinoline, 2-methylquinoline, 4-ethyl-6-isopropylquinoline, 3-butylquinoline, 8-hexylquinoline, 2,3,4,5,6,7-hexamethylquinoline, isoquinoline, 3-methylquinoline, 1-ethyl-4-isobutylisoquinoline, 5-hexylisoquinoline, 1,4,5,6,7,8-hexamethylisoquinoline, and the like, and mixtures thereof.

In the first and third further embodiments of our invention as described above, the lactams that can be employed therein can be represented by the formula

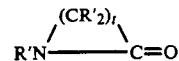

where each R' is as defined above, t is an integer having a value of 2 to about 12, and the total number of carbon atoms in each molecule of the lactam is within the range of 3 to about 24.

Examples of some lactams which can be employed according to our invention include 2-azetidinone, 2-pyrrolidone, 2-piperidone, ε-caprolactam, N-methyl-2-pyrrolidone, N-ethyl-2-piperidone, N-isopropyl-ε-caprolactam, N-dodecyl-3-octyl-2-pyrrolidone, N-cyclopentyl-4-dodecyl-2-piperidone, N-ethyl-2-pyrrolidone, N-cyclohexyl-2-pyrrolidone, N-phenyl-3-butyl-4-benzyl-2-pyrrolidone, N-m-tolyl-2-azetidinone, N-benzyl-4-o-tolyl-2-piperidone, 3-phenyl-2-pyrrolidone, lactam of N-butyl-4-cyclohexyl-7-methyl-8-aminooctanoic acid, lactam of N-octyl-3-ethyl-5-isopropyl-7-aminoheptanoic acid, lactam of 10-aminodecanoic acid, lactam of 13-aminotridecanoic acid, and the like and mixtures thereof.

Alkali metal hydrosulfides that can be employed according to our invention include sodium hydrosulfide, lithium hydrosulfide, potassium hydrosulfide, rubidium hydrosulfide, cesium hydrosulfide and mixtures thereof. Sodium hydrosulfide is preferred because of ready availability and good results obtained therewith. The alkali metal hydrosulfide can conveniently be utilized in our invention as an aqueous solution. For example, an aqueous solution of NaSH having about 60 weight percent NaSH is convenient to use.

According to one aspect of our invention, if a mixture of at least one alkali metal carbonate and at least one alkali metal hydroxide is employed in a complex-forming step instead of at least one alkali metal hydroxide alone, said mixture should contain at least about 50 mole percent alkali metal hydroxide. Preferably, said mixture will have about 55 to about 95 mole percent alkali metal hydroxide and more preferably about 70 to about 90 mole percent alkali metal hydroxide.

Alkali metal carbonates that can be employed according to our invention in admixture with at least one alkali metal hydroxide include lithium carbonate, sodium carbonate, potassium carbonate, rubidium carbonate, cesium carbonate, and mixtures thereof. Sodium carbonate is preferred because of ready availability and generally good results obtained therewith.

Alkali metal hydroxides that can be employed according to our invention include lithium hydroxide, sodium hydroxide, potassium hydroxide, rubidium hydroxide, cesium hydroxide, and mixtures thereof. Sodium hydroxide is preferred because of availability and good results obtained using this compound.

Dihaloaromatic sulfones employed in the process of our invention can be represented by the formula

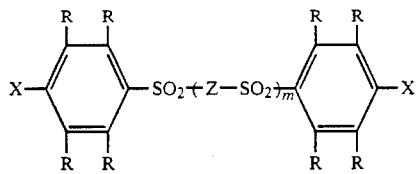

wherein each X is selected from the group consisting of fluorine, chlorine, bromine, and iodine; Z is a divalent radical selected from the group consisting of

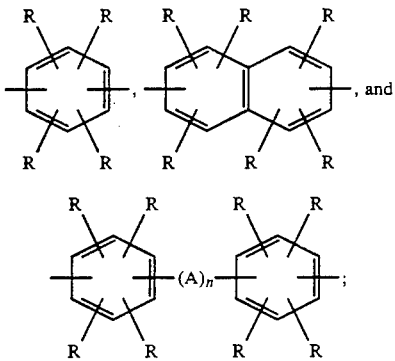

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, m is 0.

Examples of some dihaloaromatic sulfones that can be employed in the process of our invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-chlorophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)-phenyl] methane, 5,5-bis[3-ethyl-4-(p-chlorophenylsulfonyl)phenyl] nonane, and the like, and mixtures thereof. Bis(p-chlorophenyl) sulfone is preferred for reasons of availability and generally good results.

Although the amount of dihaloaromatic sulfone employed according to our invention can vary widely, generally good results are obtained with a molar ratio of dihaloaromatic sulfone to alkali metal hydrosulfide of about 0.9:1 to about 1.2:1. Preferably, this molar ratio is about 0.95:1 to about 1.05:1.

It is optional, according to the process of our invention, to employ an alkali metal carboxylate as a component in the complex forming step(s) and/or the polymerization step. If employed, it is convenient to employ the alkali metal carboxylate in the initial charge of components for preparing the complex comprising an alkali metal hydrosulfide. The molar ratio of alkali metal carboxylate to alkali metal hydrosulfide can vary over a wide range but generally will be within the range of about 0.05:1 to about 4:1, preferably about 0.1:1 to about 2:1.

Suitable alkali metal carboxylates can be represented by the formula R'''$CO_2$M where R''' is a hydrocarbyl radical selected from alkyl, cycloalkyl, and aryl and combinations thereof such as alkaryl, aralkyl, and the like, the number of carbon atoms in said R''' being within the range of 1 to about 20, and M is as previously defined.

Examples of some alkali metal carboxylates that can be employed in the process of our invention include sodium acetate, potassium dodecanoate, lithium cyclohexanecarboxylate, rubidium benzoate, cesium hexanoate, sodium o-toluate, potassium 4-ethylcyclopentanecarboxylate, and the like and mixtures thereof.

It is also optional, according to the process of our invention, to employ an alkali metal carbonate in the presence of the dihaloaromatic sulfone in the polymerization step of our process even though said alkali metal carbonate may not have been employed in the complex forming step(s). When optionally employed in the polymerization step, the alkali metal carbonate will be present in an amount of about 5 to about 50 mole percent based on the sum of alkali metal carbonate and alkali metal hydroxide or alkali metal aminoalkanoate if an alkali metal hydroxide was not employed in complex formation. Suitable alkali metal carbonates for use in this optional feature can be selected from those previously listed above.

Although the reaction temperature at which the polymerization is conducted can vary over a considerable range, generally it will be within the range of about 170° C. to about 240° C., preferably about 185° C. to about 225° C. The reaction time can vary widely, depending in part on the reaction temperature, but generally will be within the range of about 10 minutes to about 72 hours, preferably about 1 hour to about 4 hours. The pressure should be sufficient to maintain the dihaloaromatic sulfone and other organic compounds present substantially in the liquid phase.

While not wishing to be bound by theory, we currently believe that the aromatic sulfide/sulfone polymer formed by the above-described process of our invention has the recurring units:

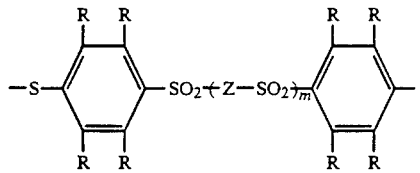

where each R, Z and m is as defined above.

The aromatic sulfide/sulfone polymers as produced by the process of our invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide and cooling the quenched mixture with stirring. The separated polymer particles can then be washed with water preferably with at least a portion of the washing being conducted at an elevated temperature within the range of about 130° C. to about 250° C. to provide a polymer which is low in ash-forming substances and is relatively light in color as well as exhibiting good melt flow stability under conditions of melt processing operations such as injection molding.

The aromatic sulfide/sulfone polymers produced by the process of our invention can be blended with fillers, fibers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, film, molded objects, and fibers. The polymers exhibit a good balance of properties for these uses, the heat deflection temperature being particularly outstanding.

EXAMPLES

Examples are provided in an effort to assist one skilled in the art to a further understanding of the invention, and yet not be unduly limitative of the reasonable scope of the invention. The particular reactants, conditions, ratios and the like, are all intended to be illustrative of our invention, and not limitative of the reasonable and suitable scope thereof.

EXAMPLE I

A series of polymerization runs according to our invention were performed in a 90 gallon stirred (500 rpm) reactor for the preparation of poly(p-phenylene sulfide/sulfone) (PPSS). The polymerization recipe for these runs is presented below.

| Recipe I | |
|---|---|
| | Compound, lb.-mole |
| N-methyl-2-pyrrolidone (NMP) | 1.9838–2.3288 |
| Sodium hydroxide (NaOH)[a] | 0.1510–0.3399 |
| Sodium carbonate ($Na_2CO_3$) | 0–0.1509 |
| Sodium hydrosulfide (NaSH)[b] | 0.2993–0.3421 |
| bis(4-chlorophenyl)sulfone (BCPS) | 0.2998–0.3402 |
| Sodium acetate (NaOAc) | 0.2999–0.3401 |
| Water ($H_2O$) | 1.3949–1.5131 |

[a]Charged as an aqueous solution of 50.364 wt. % NaOH.
[b]Charged as an aqueous solution of 58.471 wt. % NaSH and 0.526 wt. % $Na_2S$.

In each run the aqueous NaOH and a portion of the NMP was premixed in a separate vessel for 5 hours at 115°–125° C. The aqueous NaSH was then charged and the resulting mixture held for 30 minutes to form a NaSH-containing complex. In the polymerization reactor, BCPS, a portion of the NMP, $Na_2CO_3$ if used, and NaOAc was charged and heated to approximately 88° C. The complex was then charged to the polymerization reactor with a subsequent flush using the remaining NMP. The reaction mixture was then heated to 200° C. at 0.8°–1.8° C./minute in 58–156 minutes. The reaction mixture was held at 200° C. for 180–210 minutes.

At the end of polymerization, the agitator speed was increased to 550 rpm, and 0.9–2.19 lb. mole NMP and 3.79–5.93 lb. mole water was added to the reactor. The reaction mixture was then cooled to 103°–107° C. at 0.85°–1.2° C./minute. The resulting polymer slurry was filtered to facilitate recovery of the NMP. The polymer was reslurried in ambient deionized (DI) water and filtered using a hot (82° C.) DI water rinse. The polymer was then given two hot washed (176° C.) using deaerated DI water and filtered using a hot DI water rinse. The second hot wash slurry was treated with zinc acetate. The washing steps utilized a slurry mixing tank and a nylon fabric filter cloth on a moving horizontal belt filter system to separate the PPSS from the wash-/rinse liquid. The washed PPSS from each run was dried and a sample tested for inherent viscosity.

Inherent viscosities (I.V.) for PPSS samples were determined using a #100 Cannon-Fenske routine type viscometer at 30° C. with N-methyl-2-pyrrolidone (NMP) as the solvent at a polymer concentration of 0.5 g per dL NMP. Inherent viscosities provide an indication of relative molecular weights of PPSS polymers of the same type. The results obtained are presented in TABLE I.

TABLE I

| Run No. | Reactor Charges, Molar Ratio | | | | Mole % $Na_2CO_3$[a] | I.V., dL/g |
|---|---|---|---|---|---|---|
| | NaOH NaSH | $H_2O$ NaSH | NMP NaSH | BCPS NaSH | | |
| 1 | 0.5023 | 4.979 | 7.7472 | 1.008 | 50.0 | 0.13 |
| 2 | 0.7564 | 4.3411 | 6.1628 | 0.9975 | 26.9 | 0.40 |
| 3 | 0.7574 | 4.3428 | 6.1972 | 0.9966 | 26.9 | 0.47 |
| 4 | 0.7538 | 5.0007 | 7.7808 | 1.0124 | 25.7 | 0.31 |
| 5 | 0.7467 | 4.9920 | 7.7215 | 1.0046 | 25.7 | 0.28 |
| 6 | 0.9062 | 5.0070 | 7.7446 | 0.9970 | 12.7 | 0.43 |
| 7 | 0.9047 | 4.3410 | 6.1609 | 0.9972 | 12.5 | 0.40 |
| 8 | 0.9104 | 4.3563 | 6.1955 | 0.9972 | 12.5 | 0.43 |
| 9 | 0.9054 | 5.0003 | 7.7062 | 0.9967 | 9.9 | 0.34 |
| 10 | 0.9950 | 4.3499 | 6.1762 | 0.9963 | 0 | 0.41 |
| 11 | 1.0000 | 5.0176 | 7.7394 | 1.0000 | 0 | 0.36 |
| 12 | 0.9936 | 4.3578 | 5.9752 | 0.9944 | 0 | 0.34 |
| 13 | 0.9993 | 5.0136 | 7.7164 | 0.9980 | 0 | 0.39 |

[a]Mole % $Na_2CO_3$ = mole $Na_2CO_3$/(mole NaOH + $Na_2CO_3$) multiplied by 100.

The results in TABLE I show that our inventive process provides aromatic sulfide/sulfone polymers of high molecular weight as reflected in the I.V. values for Runs 2–13 inclusive. The reason for the relatively low I.V. shown for the product of Run 1 is not known at the present time. The results also show that our inventive process works with a polymerization recipe which contains a mixture of NaOH and $Na_2CO_3$ (Runs 1–9) as well as a recipe which contains NaOH alone (Runs 10–13) rather than the NaOH/$Na_2CO_3$ mixture.

EXAMPLE II

Other runs were conducted in the manner described in Example I including a control run (Run 14) which was made by charging all the polymerization reaction components together and then heating the mixture to 200° C. at a rate of about 1.65° C./minute in 44 minutes. The mixture was held at 200° C. for 210 minutes.

Run 15, made according to our invention, used the procedures described in Example I wherein a complex comprising NaSH was first formed and then charged to the polymerization reactor containing the BCPS, NaOAc, $Na_2CO_3$ and a portion of the NMP. This polymerization mixture was then heated to 200° C. at a rate of about 1.63° C./minute in 59 minutes and held at 200° C. for 210 minutes.

The polymers were recovered from Runs 14 and 15 in essentially the same manner as employed for the runs of Example I.

The recipe employed for each of Runs 14 (control) and 15 (invention) is shown below.

| Recipe II | |
|---|---|
| | Compound, lb.-mole |
| N-methyl-2-pyrrolidone (NMP) | 1.9838 |
| Sodium hydroxide (NaOH)[a] | 0.2402–0.2407 |
| Sodium carbonate (Na$_2$CO$_3$) | 0.0896 |
| Sodium hydrosulfide (NaSH)[b] | 0.3205–0.3209 |
| bis(4-chlorophenyl)sulfone (BCPS) | 0.3197–0.3200 |
| Sodium acetate (NaOAc) | 0.3206 |
| Water (H$_2$O) | 1.6945–1.6948 |

[a] Charged as an aqueous solution of 49.887 wt. % NaOH.
[b] Charged as an aqueous solution of 60.218 wt. % NaSH and 0.358 wt. % Na$_2$S.

It can be seen that in terms of recipe amounts, Runs 14 and 15 were substantially the same. Thus, the difference in I.V. results shown in TABLE II is the result of the difference in the presence or absence of the preformed complex comprising NaSH employed in the polymerization step.

TABLE II

| Run No. | Reactor Charges, Molar Ratio | | | | Mole % Na$_2$CO$_3$[a] | I.V., dL/g |
|---|---|---|---|---|---|---|
| | NaOH NaSH | H$_2$O NaSH | NMP NaSH | BCPS NaSH | | |
| 14 | 0.7554 | 5.2886 | 6.1902 | 0.9975 | 27.1 | 0.32 |
| 15 | 0.7527 | 5.2806 | 6.1821 | 0.9973 | 27.2 | 0.42 |

The results in TABLE II show that the use of the preformed complex comprising NaSH (Run 15) gave a PPSS with significantly higher I.V. than the control run PPSS (Run 14) which did not employ the preformed complex in its production.

That which is claimed is:

1. A process for the production of aromatic sulfide/sulfone polymer which comprises the steps:
   I. contacting
      (a) at least one alkali metal aminoalkanoate,
      (b) at least one organic amide and
      (c) at least one alkali metal hydrosulfide under reaction conditions of time and temperature sufficient to produce a mixture containing a complex which comprises (a) and (c) and
   II. contacting said mixture produced in step I with
      (d) water, and
      (e) at least one dihalo aromatic sulfone under polymerization conditions for a period of time sufficient to form an aromatic sulfide/sulfone polymer.

2. A process according to claim 1 wherein the molar ratio of (b) to (c) is about 2:1 to about 15:1, the molar ratio of (a) to (c) is about 0.9:1 to about 1.2:1, the molar ratio of (d) to (b) is about 0.5:1 to about 1.5:1, and the molar ratio of (e) to (c) is about 0.9:1 to about 1.2:1.

3. A process according to claim 2 wherein said reaction conditions of step I employ a temperature of about 105° C. to about 205° C. and a time of about 1 minute to about 30 minutes.

4. A process according to claim 3 wherein (a) is represented by the formula R'$_2$N(CR'$_2$)$_q$CO$_2$M, wherein each R' is selected from the group consisting of hydrogen and hydrocarbyl radicals selected from alkyl, cycloalkyl, and aryl, and combinations thereof, the number of carbon atoms in each of said hydrocarbyl radicals being within the range of 1 to about 12, M is an alkali metal selected from lithium, sodium, potassium, rubidium and cesium, q is an integer having a value of 1 to about 12, and the total number of carbon atoms in each molecule of (a) is within the range of 2 to about 24; (b) is an organic amide having 1 to about 24 carbon atoms per molecule; (c) is selected from the group consisting of lithium hydrosulfide, sodium hydrosulfide, potassium hydrosulfide, rubidium hydrosulfide and cesium hydrosulfide; and (e) is represented by the formula

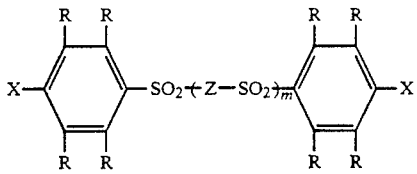

where each X is selected from the group consisting of fluorine, chlorine, bromine, and iodine; Z is a divalent radical selected from the group consisting of

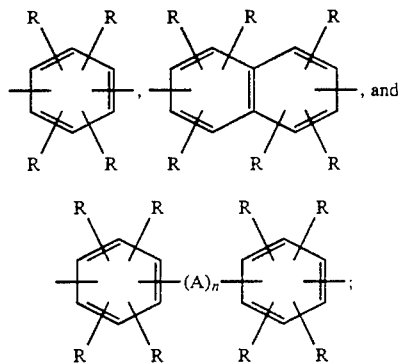

m is 0 or 1; n is 0 or 1; A is selected from the group consisting of oxygen, sulfur, sulfonyl, and CR$_2$; and each R is selected from the group consisting of hydrogen and alkyl radicals having 1 to about 4 carbon atoms, the total number of carbon atoms in all of the R groups in the molecule being 0 to about 12.

5. A process according to claim 4 wherein said polymerization conditions of step II employ a temperature of about 170° C. to about 240° C., a time of about 10 minutes to about 72 hours, and pressure sufficient to maintain liquid phase conditions.

6. A process according to claim 5 wherein m is 0 and (e) is represented by the formula

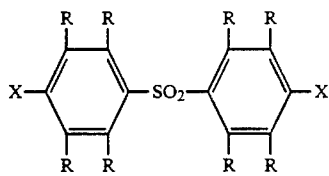

wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

7. A process according to claim 6 wherein (a) is sodium N-methyl-4-aminobutyrate (b) is N-methyl-2-pyrrolidone, and (c) is sodium hydrosulfide.

8. A process according to claim 7 wherein (e) is bis(4-chlorophenyl) sulfone.

* * * * *